US008230368B2

(12) United States Patent
Choi

(10) Patent No.: US 8,230,368 B2
(45) Date of Patent: Jul. 24, 2012

(54) MOBILE COMMUNICATION TERMINAL AND METHOD FOR DISPLAYING A WORD OR PHRASE ON AN IDLE SCREEN USING A MINI PLANAR FUNCTION

(75) Inventor: Changkeun Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 11/749,051

(22) Filed: May 15, 2007

(65) Prior Publication Data

US 2008/0016438 A1    Jan. 17, 2008

(30) Foreign Application Priority Data

Jul. 11, 2006  (KR) .................. 10-2006-0064950

(51) Int. Cl.
*G06F 3/048* (2006.01)

(52) U.S. Cl. .................. 715/867; 715/774

(58) Field of Classification Search .............. 715/864, 715/867, 963, 705, 708, 715, 767, 774; 455/566, 455/414.1

See application file for complete search history.

(56) References Cited

U.S. PATENT DOCUMENTS

| 7,017,125 | B1 * | 3/2006 | Matsumoto | 715/864 |
| 7,113,809 | B2 * | 9/2006 | Noesgaard et al. | 455/566 |
| 7,228,151 | B2 * | 6/2007 | Kota et al. | 455/556.1 |
| 7,401,296 | B2 * | 7/2008 | Watanabe et al. | 715/763 |
| 7,598,945 | B2 * | 10/2009 | Lee | 345/169 |
| 7,930,366 | B2 * | 4/2011 | Sakaguchi et al. | 709/219 |
| 2004/0075701 | A1 * | 4/2004 | Ng | 345/867 |
| 2004/0077340 | A1 * | 4/2004 | Forsyth | 455/414.1 |
| 2005/0114800 | A1 * | 5/2005 | Rao | 715/867 |
| 2006/0234686 | A1 * | 10/2006 | Grassiotto | 455/414.1 |
| 2007/0006008 | A1 * | 1/2007 | McKenna | 713/323 |
| 2007/0094596 | A1 * | 4/2007 | Nielsen et al. | 715/700 |
| 2008/0168389 | A1 * | 7/2008 | Kurzweil et al. | 715/809 |

FOREIGN PATENT DOCUMENTS

| JP | 6138974 | 5/1994 |
| JP | 11065798 | 3/1999 |
| JP | 2002271475 | 9/2002 |
| KR | 1020050001134 | 1/2005 |
| KR | 1020050053169 | 6/2005 |

\* cited by examiner

*Primary Examiner* — Robert Stevens
*Assistant Examiner* — Andrew Tank
(74) *Attorney, Agent, or Firm* — Lee, Hong, Degerman, Kang & Waimey

(57) ABSTRACT

A mobile communication terminal displays a word or phrase on an idle screen of the terminal using a mini planar function. A user provides one or more words or phrases associated with specific events, and when the specific event occurs, the associated word or phrase is displayed. Display attributes may be established and enabled for each of the words or phrases. Alternatively, each of the words or phrases may be associated with a starting time for display and an ending time for display, and if the current time is within the display period for more than one word or phrase, then each word or phrase is displayed.

10 Claims, 8 Drawing Sheets

MOBILE COMMUNICATION TERMINAL AND METHOD FOR DISPLAYING A WORD OR PHRASE ON AN IDLE SCREEN USING A MINI PLANAR FUNCTION

CROSS-REFERENCE TO RELATED APPLICATION

The present application claims priority from Korean Patent Application No. 10-2006-0064950, filed 11 Jul. 2006, the entire contents of each is incorporated herein by reference.

BACKGROUND

1. Field of the Invention

This document relates to a mobile communication terminal and a method for displaying a word or phrase on an idle screen of the mobile communication terminal using a mini planar function.

2. Description of Related Art

Usually, an idle screen is a default screen displayed when a mobile communication terminal is idle or specific functions not performing. A user may display an electronic calendar, a clock, or a desired word or phrase on the idle screen.

However, a conventional mobile communication terminal displays only one word or phrase set by the user on the idle screen. Accordingly, when the user desires to display a new word or phrase on the idle screen, a new word or phrase must be entered using new word or phrase setup menu.

Further, since the word or phrase displayed on the idle screen of the terminal is merely the word or phrase provided by the user, no visual or auditory effects are provided.

SUMMARY OF THE INVENTION

Accordingly, the present invention solves the above-mentioned problems occurring in the prior art, and an object of the present invention is to provide a mobile communication terminal and a method for displaying a word or phrase on an idle screen of the mobile communication terminal, which can use a mini planar function for displaying a plurality of words or phrases set by a user on the idle screen using various techniques.

Additional advantages, objects and features of the invention will be set forth in part in the description which follows and in part will become apparent to those having ordinary skill in the art upon examination of the following or may be learned from practice of the invention.

According to one aspect of the invention, a method for displaying a word or phrase on an idle screen comprises providing a plurality of words or phrases for display wherein each of the plurality of words or phrases is associated with one of a plurality of events, storing the words or phrases in memory, and displaying the associated word or phrase when one of the plurality of events occurs. The method further comprises converting the associated word or phrase into audio and providing the converted word or phrase to a terminal speaker.

The plurality of events include whether a mobile communication terminal slide or folder is opened or closed, whether a specific terminal key is selected, and whether the terminal is touched by a user.

The method further comprises providing a plurality of display attributes for each of the plurality of words or phrases wherein the plurality of display attributes comprises a display alignment, a movement feature, a character color, and a background color. Each display attribute may be individually enabled for each of the plurality of words or phrases.

In another embodiment, a starting and ending display time may be associated with each of the plurality of words and phrases, and the word or phrase is displayed if the current time is within the display period. More than one word or phrase may be displayed if the current time is within each display period.

In yet another embodiment, a mobile communication terminal comprises a display, a menu for receiving a plurality of words or phrases, an input device for providing the plurality of words or phrases wherein each of the plurality of words or phrases is associated with one of a plurality of events, a memory storing the plurality of words or phrases, and a controller displaying a corresponding one of the plurality of words or phrases on the display when one of the plurality of events associated with the plurality of words or phrases occurs.

In still another embodiment, a starting and ending display time may be associated with each of the plurality of words and phrases, and the word or phrase is displayed if the current time is within the display period. More than one word or phrase may be displayed if the current time is within each display period.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION

The present invention will be described in detail with reference to the accompanying drawings.

Figure 1:
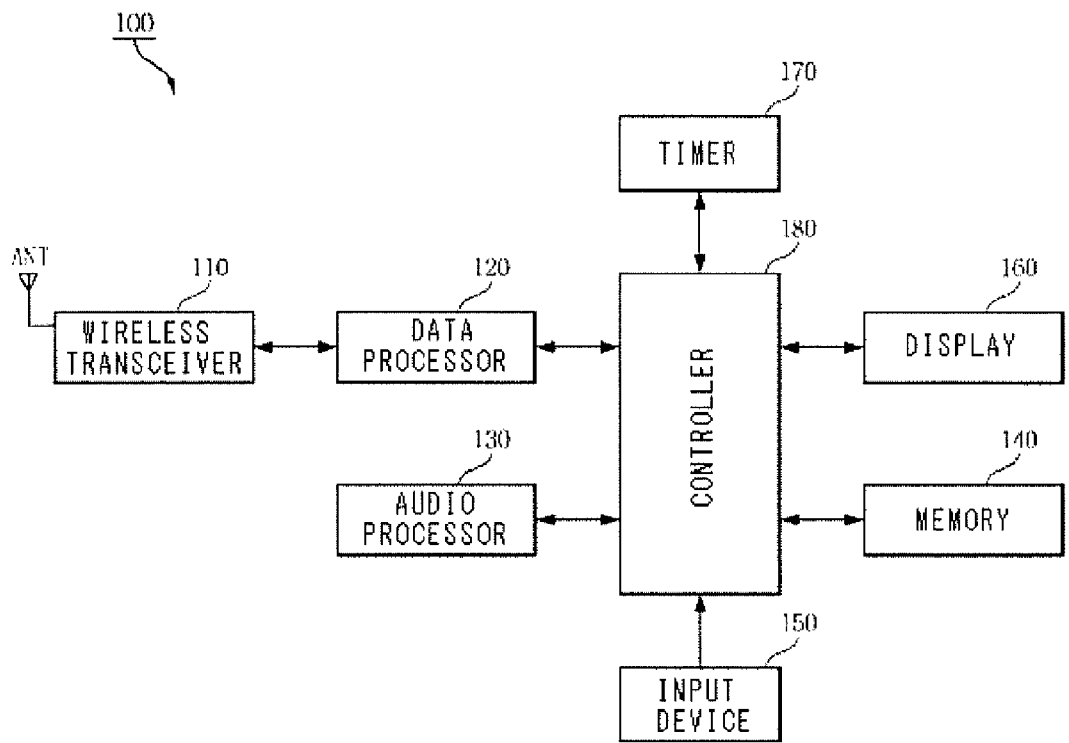
FIG. 1 is a block diagram of a mobile communication terminal according to one embodiment of the present invention.

FIG. 1 is a block diagram of a mobile communication terminal according to one embodiment of the present invention. The mobile communication terminal 100 includes a wireless transceiver 110, a data processor 120, an audio processor 130, a memory 140, an input device 150, a display 160, a timer 170, and a controller 180.

The wireless transceiver 110 performs a communication function of the mobile communication terminal 100. The wireless transceiver 110 includes a RF sender for up-converting and amplifying a transmitted signal, and a RF receiver for amplifying and down-converting a received signal.

The data processor 120 includes a sender for encoding and modulating the transmitted signal and a receiver for decoding and demodulating the received signal.

The audio processor 130 produces an audio signal that is decoded by the data processor 120, or sends an audio signal produced by a microphone (MIC) to the data processor 120.

According to the present invention, the audio processor 130 converts a word or phrase provided by the user into recognizable speech under the control of the controller 180, and then provides the converted speech to a speaker (not shown).

The memory 140 includes at least one program memory and data memory. The program memory stores programs for controlling general operations of the mobile communication terminal 100. The memory 140 stores a software program and data for displaying words or phrases provided by a user on an idle screen.

The memory 140 also stores the words or phrases provided by the user and the associated display setup information. The display setup information is information about how to display the words or phrase on the idle screen. The display setup information will be explained in detail below.

The display 160 displays information and various menu screens, all of which are provided from the mobile communication terminal 100, and may be a Liquid Crystal Display (LCD) or an Organic Light Emitting Diode (OLED). The display 160 may include two or more displays including a display on an external surface and a display on an internal surface of the terminal.

According to the present invention, the display 160 displays the word or phrase provided by the user on the idle screen under the control of the controller 180. The word or phrase is displayed according to a predetermined method.

When a color change function is set, the display 160 can display change colors of the word or phrase. Further, when a color having a specific value is preset, the display 160 also can display the preset specific color.

When a flow effect is set, the display 160 can scroll the word or phrase from the right side to the left side or from the left side to the right side on the idle screen. Also, the terminal can highlight the word or phrase when a highlight effect is set.

The input device 150 includes various keys for inputting numeral and character information, and at least one function key for setting various functions. The input device 150 may be implemented as a keypad comprising a directional key, a jog-dial, a touch screen, or a joystick.

The input device 150 receives a word or phrase provided by the user for display on the idle screen and sends the received word or phrase to the controller 180. A plurality of words or phrases may be provided, and a display time of each word or phrase may also be provided.

For example, the user can provide the word or phrase through the input device 150 to display "No Smoking" on the idle screen from 8 a.m. to 5 p.m., "Exercising" from 5 p.m. to 8 p.m. and "No Drinking" from 8 a.m. to 12 p.m.

The words or phrases and the display time for each are stored in the memory 140 under the control of the controller 180.

The timer 170 provides present time information to the controller 180.

The controller 180 performs the general control of the terminal 100. The controller 180 compares the display time of the phrases and words stored in the memory 140 with the present time information provided by the timer 170. When the present time reaches display time of the word or phrase, the controller 180 displays the corresponding word or phrase on the display 160.

Figure 2:
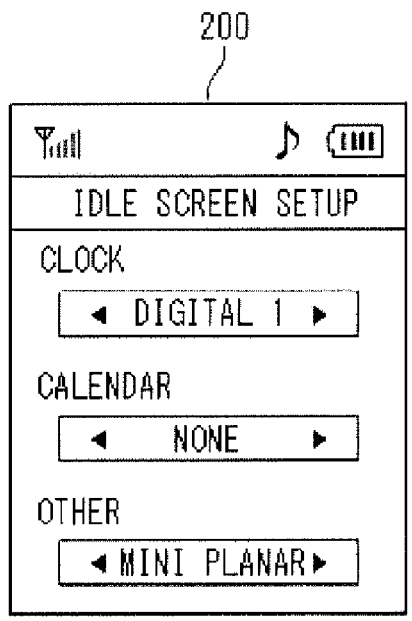
FIG. 2 shows an example of a screen for setting a mini planar function according to one embodiment of the present invention.

FIG. 2 shows an example of a screen for setting a mini planar function according to an exemplary embodiment of the present invention. The user can set the mini planar function by entering an idle screen setup menu. The mini planar function displays a specific word or phrase provided by the user, for example, reminder such as "No Smoking", "Exercising", and "No Drinking". The user can also set additional display functions such as a clock or an electronic calendar.

FIGS. 3A to 3D are examples of screens illustrating a process in which a word or phrase is provided to an idle screen using the mini planar function, according to the present invention.

Figure 3A:
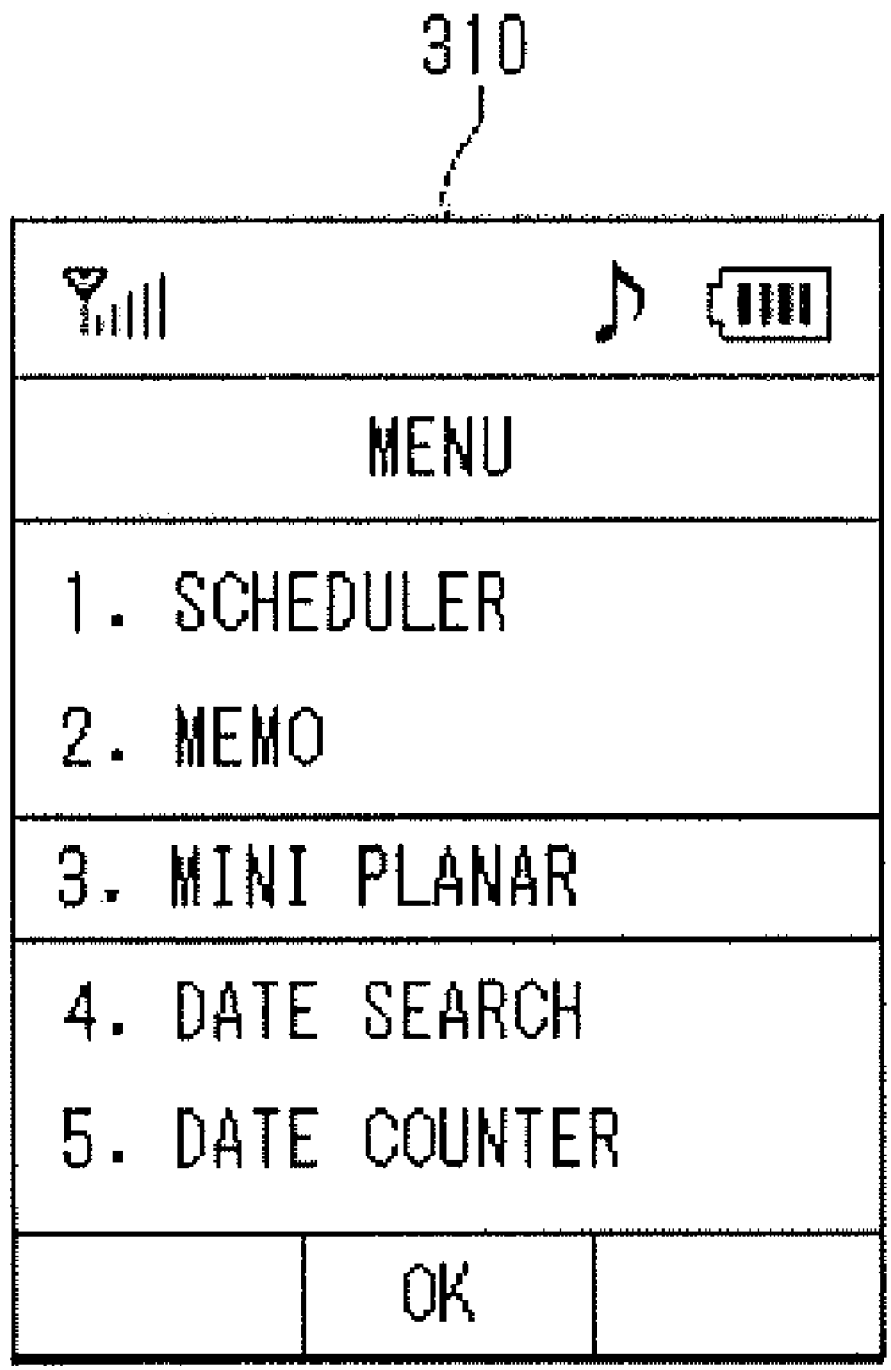
FIGS. 3A to 3D show examples of menu screens for providing a word or phrase for display on an idle screen using the mini planar function, according to an exemplary embodiment of the present invention.

Referring to FIG. 3A, if the user enters a schedule management menu, a schedule management menu screen 310 is displayed enabling functions such as a scheduler, a memo, a mini planar, a date search, and a date counter to be selected.

Figure 3B:
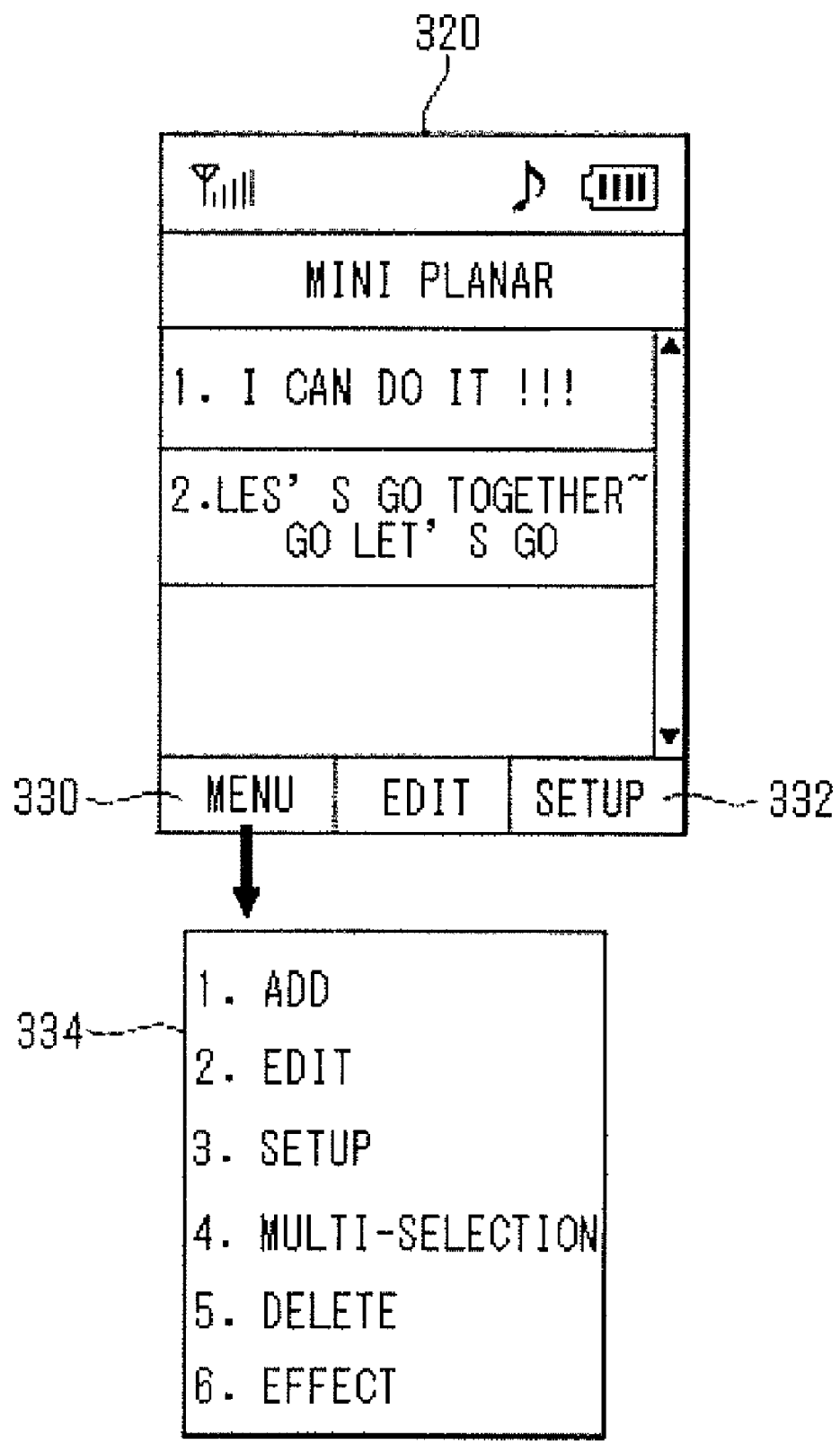

If the user selects a menu No. 3, "mini planar," on the schedule management menu screen 310, a idle screen word or phrase input screen 320 is displayed as shown in FIG. 3B. The user can provide a specific word or phrase using the idle screen word or phrase input screen 320.

Figure 3C:
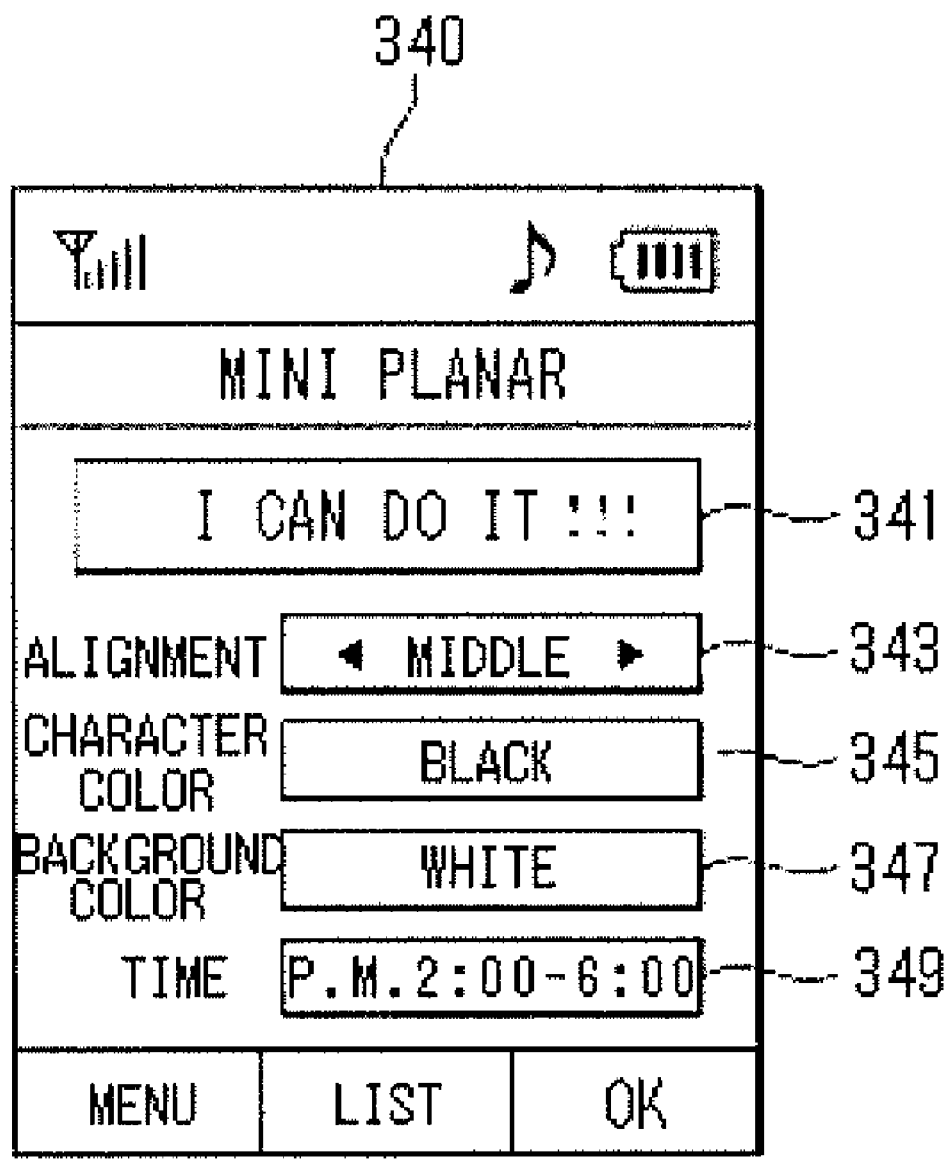

If the user selects a menu No. 3 "setup" among sub-menus 334 that are displayed in a popup form by selecting a setup 332 or a menu 330 after inputting a phrase, "I can do it", a word setup screen 340 shown in FIG. 3C is displayed.

Referring to FIG. 3C, the word setup screen 340 provides a preview screen 341 for checking the word or phrase provided by the user, a menu window 343 for aligning the word or phrase on the idle screen, a menu window 345 for setting a character color of the word or phrase, a menu window 347 for setting a background color of a predetermined region in which the word or phrase will be displayed, and a menu window 349 for setting a time that the word or phrase will be displayed on the idle screen.

Figure 3D:
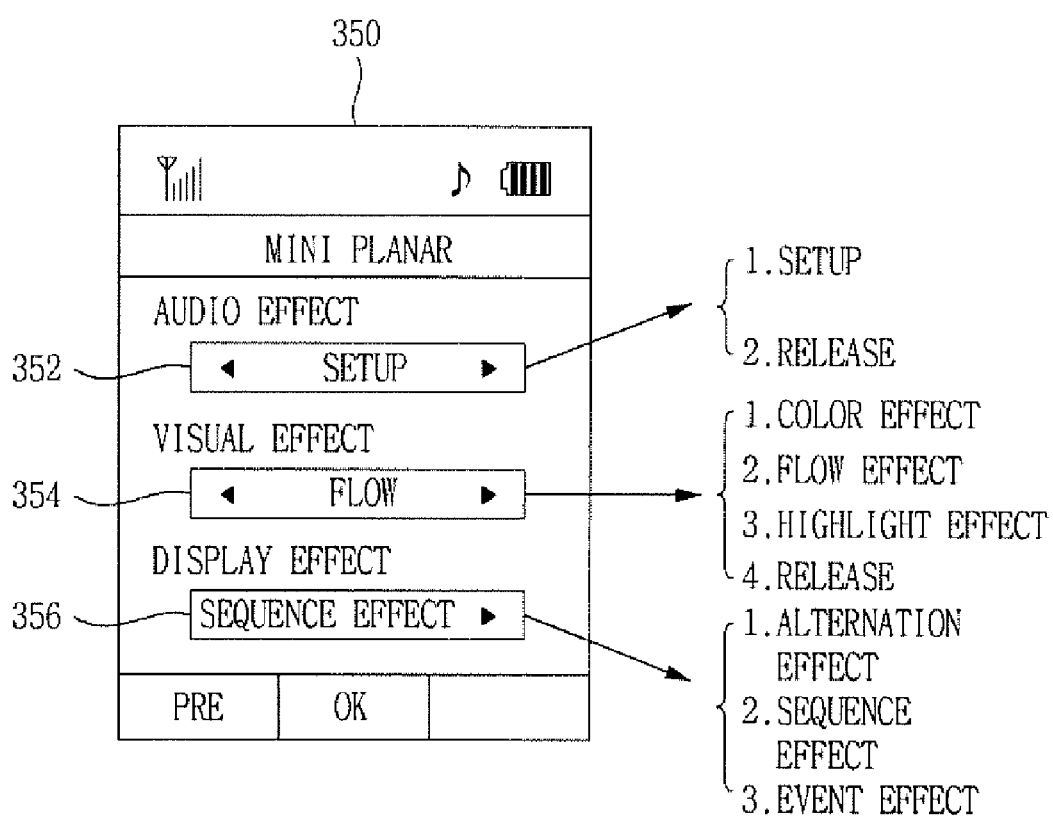

If the user selects a menu No. 6 "effect" among sub menus 334 (FIG. 3B) that are displayed in the popup form, an effect setup screen 350 shown in FIG. 3D is displayed.

Referring to FIG. 3D, the effect setup screen 350 includes a menu window 352 for setting/releasing an audio effect, a menu window 354 for setting/releasing a visual effect, and a menu window 356 for setting/releasing a display effect.

If the audio effect is set, the word or phrase provided by the user is sent to a speaker while being displayed on the idle screen. The audio processor 130 converts the word or phrase provided by the user into audio using text-to-speech conversion and provides the converted audio to a speaker (not shown).

The word or phrase displayed on the idle screen may have visual effects as determined by the settings on the effect setup screen. The visual effects will affect the way the word or phrase is displayed and may include a color effect, a flow or scrolling effect, and a highlight effect. If the visual effect is released, the word or phrase is displayed on the idle screen according to the character color and the background color set by using the word setup screen 340 shown in FIG. 3C.

The display effect includes an alternation effect, a sequence effect and an event effect. The alternation effect alternatively displays the plurality of words or phrases inputted by the user on the idle screen. The sequence effect sequentially displays the plurality of words or phrases on the idle screen in order of time set by using the word setup screen 340 shown in FIG. 3C. The event effect displays the words or phrases on the idle screen according to the corresponding event.

Even though the plurality of words or phrases is set according to a specific time in the word setup screen shown in FIG. 3C, the word of phrase may also be displayed according to a specific terminal event, such as opening or closing a slider or folder, or touching the terminal.

Figure 3E:
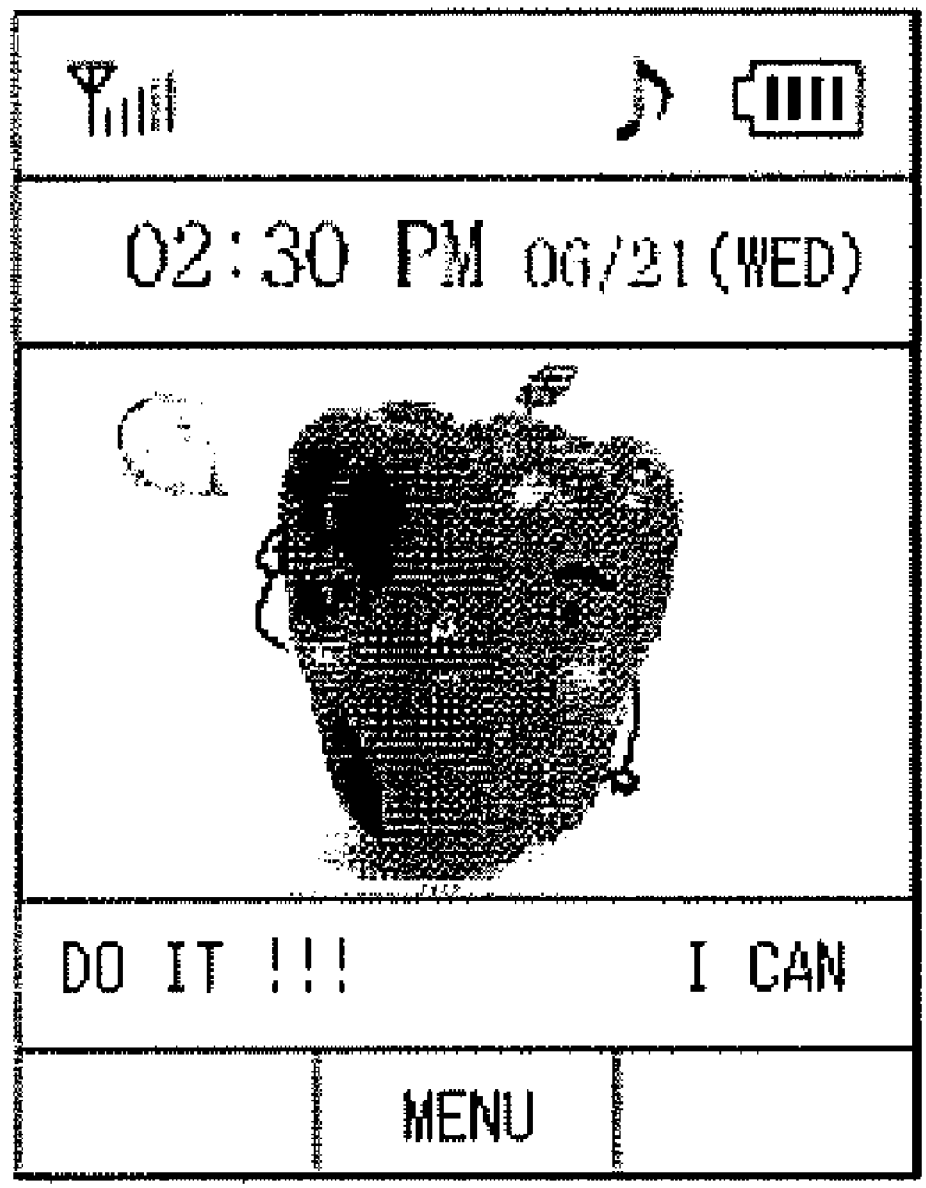
FIG. 3E is an example of a screen in which the word or phrase provided by a user is displayed on the idle screen according to one embodiment of the present invention.

FIG. 3E shows an example of a screen where the word or phrase set by a user is displayed on the idle screen, according to the present invention.

Referring to FIG. 3E, if the flow effect is set to the phrase "I can do it!!!" set by the user, the phrase "I can do it!!!" scrolls across the display.

Figure 4:
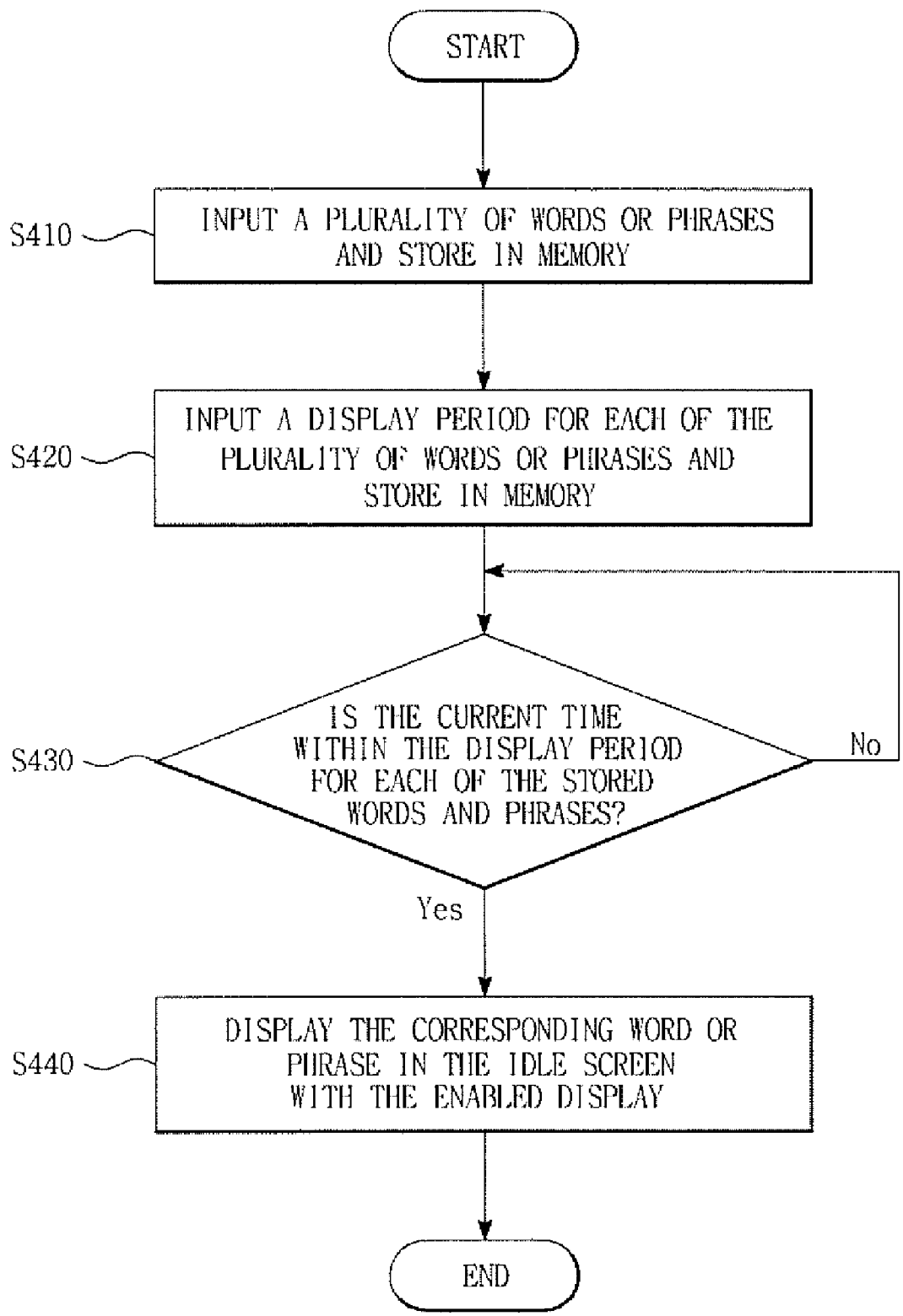
FIG. 4 is a flow chart illustrating a method for displaying a word or phrase on an idle screen of a mobile communication terminal using a mini planar function according to one embodiment of the present invention.

FIG. 4 shows a flow chart illustrating a method for displaying a word or phrase on an idle screen using a mini planar function according to the present invention. First, the user enters the idle screen word input menu to input the plurality of words or phrases through the input device 150 S410. Next, the user inputs each display time of the plurality of words or phrases inputted by the user S420. The plurality of words or phrases and each display time are stored in the memory 140 by selecting a storage menu by the user.

The controller 180 compares the present time with the times associated with each word or phrase stored in memory S430. If the present time is later than the time corresponding to a word or phrase, then that word or phrase is displayed S440. If not, the display is unchanged.

Figure 5:
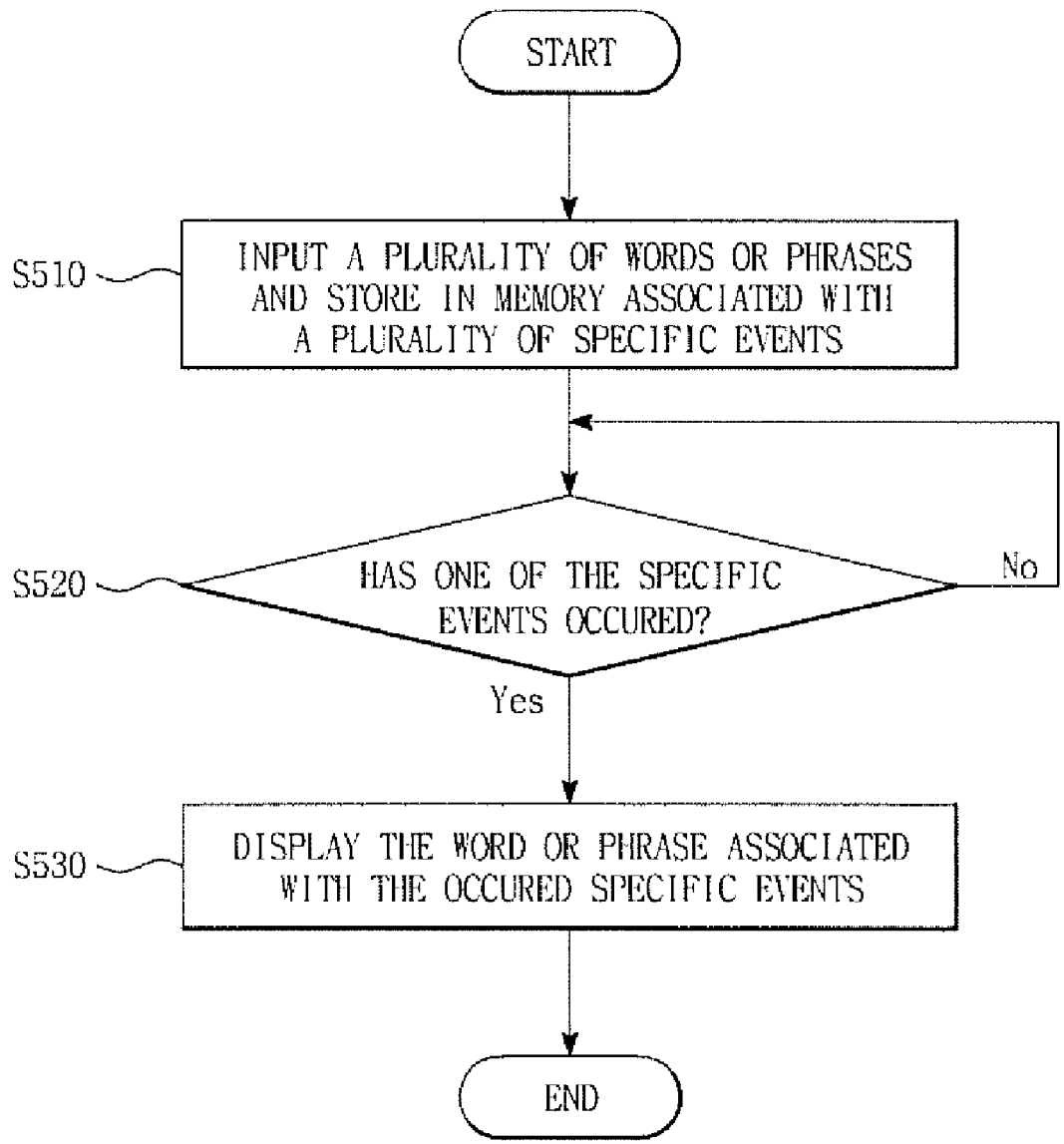
FIG. 5 is a flow chart illustrating a method for displaying the word or phrase on the idle screen of the mobile communication terminal using the mini planar function according to another embodiment of the present invention.

FIG. 5 shows a flow chart illustrating a method for displaying the word or phrase on the idle screen of the terminal using the mini planar function according to another embodiment of the present invention.

Referring to FIG. 5, the user inputs a plurality of words or phrases through the input device 150 and associated specific conditions S510. The term, "the plurality of words or phrases" includes the display effects such as, the background color of the region that the plurality of words or phrases is displayed, the visual effect, the audio effect, and the display times that are set to the specific values, and the display effect is set.

The controller 180 checks whether the specific event occurs S520. The term "specific event" means if the slide or folder of slide type or folder type terminal is opened or closed, if a predetermined specific key is selected, or if the terminal 100 is touched by the user.

If the specific event occurs S520, the controller 180 displays the word or phrase associated with that specific event having occurred S530.

Moreover, if the display 160 includes a display on an interior and exterior surface of the terminal, and if the slide or folder of the mobile communication terminal 100 is opened when a specific word or phrase is displayed on the external display, the controller 180 displays a different word or phrase on the interior display.

As described above, according to the present invention, two or more words or phrases set by the user can be displayed on the idle screen in various methods. Accordingly, various visual effects can be provided for the user as well as the mini planar function can be effectively used.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for displaying a word or phrase on an idle screen of a mobile communication terminal, the method comprising:

receiving input of a plurality of words or phrases for display on the idle screen via a user input device of the mobile communication terminal, wherein each of the plurality of words or phrases is associated with one of a plurality of periods of time for display, each of the plurality of periods of time for display having a duration that is defined by a corresponding starting time and a corresponding ending time;

storing the plurality of words or phrases in a memory of the mobile communication terminal; and displaying at least one of the associated word or phrase on the idle screen for the associated one of the plurality of periods of time beginning when the corresponding starting time is a current time, wherein a first word or phrase of the plurality of words or phrases is displayed via repeatedly scrolling the first word or phrase on the idle screen upon a first period of time of the plurality of periods of time for display, wherein a second word or phrase of the plurality of words or phrases is displayed via repeatedly scrolling the second word or phrase on the idle screen upon a second period of time of the plurality of periods of time for display, wherein the first word or phrase and the second word or phrase are concurrently displayed via repeatedly scrolling the respective first word or phrase and the second word or phrase when the current time is within both the first period of time and the second period of time, and wherein the second word or phrase is different than the first word or phrase.

2. The method of claim 1, further comprising:

converting the displayed at least one of the associated word or phrase into an audio signal; and providing the converted at least one of the associated word or phrase to a speaker of the mobile communication terminal.

3. The method of claim 1, further comprising:

providing a plurality of display attributes for each of the plurality of words or phrases, wherein the plurality of display attributes comprises at least a display alignment, a character color or a background color.

4. The method of claim 3, wherein each of the plurality of display attributes is individually enabled for each of the respective plurality of words or phrases.

5. A mobile communication terminal, comprising:

a display including an idle screen;

an user input device configured for receiving a plurality of words or phrases, wherein each of the plurality of words or phrases is associated with one of a plurality of periods of time for display, each of the plurality of periods of time for display having a duration that is defined by a corresponding starting time and a corresponding ending time;

a memory configured for storing the plurality of words or phrases; and a controller configured for controlling the display to display at least one of the associated word or phrase on the idle screen for the associated one of the plurality of periods of time beginning when the corresponding starting time is a current time, wherein a first word or phrase of the plurality of words or phrases is displayed via repeatedly scrolling the first word or phrase on the idle screen of the display upon a first period of time of the plurality of periods of time for display, wherein a second word or phrase of the plurality of words or phrases is displayed via repeatedly scrolling the second word or phrase on the idle screen of the display upon a second period of time of the plurality of periods of time for display, wherein the controller controls the display to display the first word or phrase and the second word or phrase concurrently via repeatedly scrolling the first word or phrase and the second word or phrase when the current time is within both the first period of time and the second period of time, and wherein the second word or phrase is different than the first word or phrase.

6. The terminal of claim 5, further comprising:

an audio processor for converting each of the displayed at least one of the associated word or phrase into an audio signal; and a speaker for reproducing the converted at least one of the associated word or phrase.

7. The terminal of claim 5, wherein:

the controller controls the display to display a menu window for providing a plurality of display attributes for each of the plurality of words or phrases; and the plurality of display attributes comprises at least a display alignment, a character color or a background color.

8. The terminal of claim 7, wherein each of the plurality of display attributes is individually enabled for each of the respective plurality of words or phrases.

9. A method for displaying a word or phrase on an idle screen of a display of a mobile communication terminal, the method comprising:

receiving input of a plurality of words or phrases for display via a user input device of the mobile communication terminal, wherein each of the plurality of words or phrases is associated with one of a plurality of events;

storing the plurality of words or phrases in a memory of the mobile communication terminal;

displaying the associated word or phrase on a designated area of the idle screen when the associated one of the plurality of events occurs, and controlling the display to display a graphical user interface (GUI) for receiving input to change an event associated with the word or phrase currently displayed on the designated area of the idle screen from a first event to a second event, wherein a first word or phrase of the plurality of words or phrases is displayed via repeatedly scrolling the first word or phrase on the designated area of the idle screen during the first event, wherein a second word or phrase of the plurality of words or phrases is displayed via repeatedly scrolling the second word or phrase on the designated area of the idle screen upon the change to the second event via the GUI, and wherein the second word or phrase is different than the first word or phrase.

10. A mobile communication terminal comprising:

a display including an idle screen;

an input device configured for receiving a plurality of words or phrases, wherein each of the plurality of words or phrases is associated with one of a plurality of periods of time for display, each of the plurality of periods of time for display having a duration that is defined by a corresponding starting time and a corresponding ending time;

a memory configured for storing the plurality of words or phrases; and a controller configured for controlling the display to display the associated word or phrase on a predetermined area of the idle screen for the associated one of the plurality of periods of time beginning when the corresponding starting time for display is a current time and controlling the display to display a graphical user interface (GUI) for receiving input to change an event associated with the word or phrase currently displayed on the predetermined area of the idle screen of the display from a first event to a second event, wherein a first word or phrase of the plurality of words or phrases is displayed via repeatedly scrolling the first word or phrase on the idle screen during the first event, wherein a second word or phrase of the plurality of words or phrases is displayed via repeatedly scrolling the second word or phrase on the idle screen upon the change to the second event via the received input at the GUI, and wherein the second word or phrase is different than the first word or phrase.

* * * * *